United States Patent
O'Shea et al.

(10) Patent No.: US 11,595,230 B2
(45) Date of Patent: *Feb. 28, 2023

(54) SIGNALING OF TIME FOR COMMUNICATION BETWEEN INTEGRATED CIRCUITS USING MULTI-DROP BUS

(71) Applicant: Apple Inc., Cupertino, CA (US)

(72) Inventors: Helena Deirdre O'Shea, San Jose, CA (US); Matthias Sauer, San Jose, CA (US); Jorge L. Rivera Espinoza, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,979

(22) Filed: Jun. 30, 2022

(65) Prior Publication Data

US 2022/0337452 A1 Oct. 20, 2022

Related U.S. Application Data

(63) Continuation of application No. 16/885,966, filed on May 28, 2020, now Pat. No. 11,398,926.

(Continued)

(51) Int. Cl.
*H04L 12/40* (2006.01)
*H04L 12/413* (2006.01)

(52) U.S. Cl.
CPC .... *H04L 12/4135* (2013.01); *H04L 12/40071* (2013.01); *H04L 12/40084* (2013.01); *H04L 2012/40215* (2013.01)

(58) Field of Classification Search
CPC ............ H04L 12/4012; H04L 12/4135; H04L 12/400071; H04L 2012/40215
See application file for complete search history.

(56) References Cited

U.S. PATENT DOCUMENTS 6,981,073 B2    12/2005   Wang et al.
9,119,215 B2    8/2015    Linsky et al.
(Continued)

OTHER PUBLICATIONS

United States Office Action, U.S. Appl. No. 16/885,966, dated Dec. 27, 2021, 11 pages.

*Primary Examiner* — Henry Tsai
*Assistant Examiner* — Christopher A Daley
(74) *Attorney, Agent, or Firm* — Fenwick & West LLP

(57) ABSTRACT

Embodiments relate to including information in a data packet transmitted by a transmitting integrated circuit (e.g., SOC) to account for a time delay associated with an unsuccessful arbitration attempt to send the data packet over a multi-drop bus. The unsuccessful arbitration attempt by the integrated circuit may delay the transmission of the data packet until the multi-drop bus becomes available for the integrated circuit to send the data packet. The data packet includes a data field to include time delay information caused by the unsuccessful arbitration attempt. A receiving integrated circuit may determine the time that the data packet would have been sent out from the transmitting integrated circuit absent the unsuccessful arbitration attempt based on the delay information. Embodiments also relate to a synchronization generator circuit in an integrated circuit that generates timing signals indicating times at which periodic events occur at another integrated circuit.

20 Claims, 11 Drawing Sheets

Related U.S. Application Data

(60) Provisional application No. 62/972,566, filed on Feb. 10, 2020.

(56) References Cited

U.S. PATENT DOCUMENTS

| | | |
|---|---|---|
| 9,720,439 B2 | 8/2017 | Tennant |
| 11,106,612 B2 | 8/2021 | O'Shea et al. |
| 11,176,069 B2 | 11/2021 | O'Shea et al. |
| 11,398,926 B2 * | 7/2022 | O'Shea ............. H04L 12/40084 |
| 2007/0235175 A1 * | 10/2007 | DeGroot ................... F28F 9/04 |
| | | 165/173 |
| 2011/0268024 A1 | 11/2011 | Jamp et al. |
| 2018/0011813 A1 | 1/2018 | Mann et al. |
| 2019/0042518 A1 | 2/2019 | Marolia et al. |
| 2019/0104437 A1 | 4/2019 | Bartfai-Walcott et al. |
| 2019/0171595 A1 | 6/2019 | Mishra et al. |
| 2019/0227962 A1 | 7/2019 | O'Shea et al. |
| 2019/0335538 A1 | 10/2019 | Gopal et al. |
| 2019/0342225 A1 | 11/2019 | Sanghi et al. |
| 2021/0250201 A1 * | 8/2021 | O'Shea ............. H04L 12/40084 |

\* cited by examiner

SIGNALING OF TIME FOR COMMUNICATION BETWEEN INTEGRATED CIRCUITS USING MULTI-DROP BUS

CROSS-REFERENCE TO RELATED APPLICATIONS

This application is a continuation application of U.S. patent application Ser. No. 16/885,966, filed on May 28, 2020, which claims priority under 35 U.S.C § 119(e) to U.S. Provisional Patent Application No. 62/972,566, filed on Feb. 10, 2020, which are incorporated by reference herein in their entirety.

BACKGROUND

1. Field of the Disclosure

The present disclosure relates to coordinating operations of multiple integrated circuit (IC) chips in an electronic device.

2. Description of the Related Art

Electronic devices may include multiple systems on chips (SOCs) for communicating with other devices using various communication protocols. As the size of a communication system in an electronic device becomes smaller while the functionality of the communication system increases, more SOCs are incorporated into the electronic device or more subsystems are added to each SOC. These SOCs may communicate with a host (e.g., a central processor or an application processor) over a dedicated communication path (e.g., peripheral component interconnect express (PCIe)) to transmit data.

As a result of integrating multiple communication systems and other subsystems into the electronic device, various issues or complications may arise. These issues or complications include conflicts and constraints imposed by using shared communication channel such as a multi-drop bus between the SOCs and the subsystems. Because the same multi-drop bus is shared by multiple SOCs and subsystems, arbitration is performed to coordinate transmission of data between SOCs. Such arbitration may cause timing delay in transmitting data over the multi-drop bus.

SUMMARY

Embodiments relate to integrated circuits (e.g., SOCs) that communicate over a multi-drop bus to communicate data where at least one of the integrated circuit includes information on a time delay in an outbound data packet. The time delay represents a time difference between (i) a first time when the outbound data packet could have been transmitted over the multi-drop bus with an earliest arbitration attempt to transmit the outbound data packet over the multi-drop bus being successful, and (ii) a second time when the outbound data packet is actually sent out over the multi-drop bus with a successful arbitration attempt to transmit the outbound data packet occurring subsequent to the earliest arbitration attempt.

Embodiments also relate to a synchronization generator circuit in an integrated circuit that generates timing signals indicating when periodic events are expected to occur at another integrated circuit. Both integrated circuits communicate at least over a multi-drop bus. The integrated circuit receives timing packets over the multi-drop bus from the other integrated circuit. The timing packets indicates times periodic events occurs at the other integrated circuit. A component circuit of the integrated circuit receives the signals from the synchronization generator circuit to perform its operations.

Figure 1:
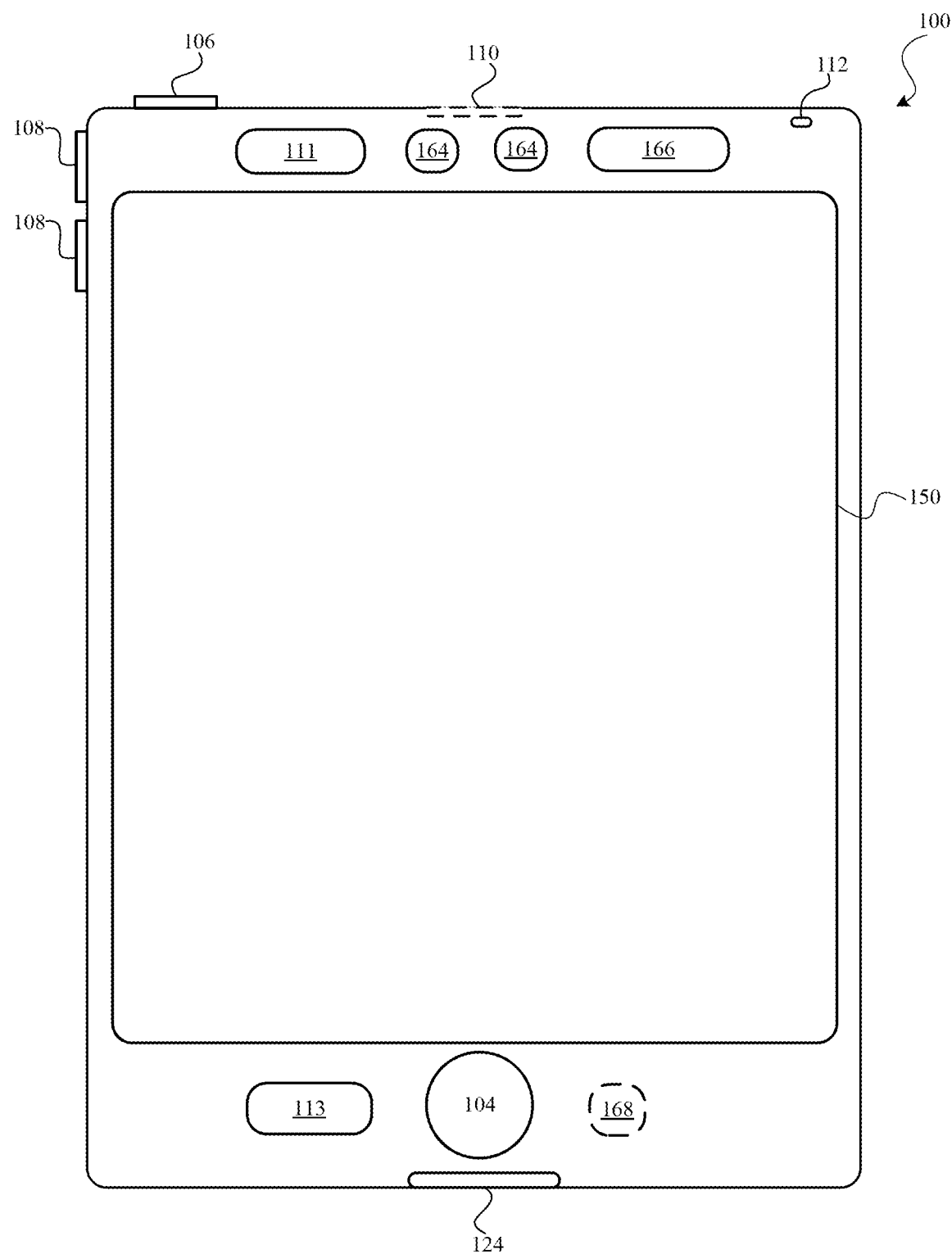
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to including information in a data packet transmitted by a transmitting integrated circuit (e.g., SOC) to account for a time delay associated with an unsuccessful arbitration attempt to send the data packet over a multi-drop bus. The unsuccessful arbitration attempt by the integrated circuit may delay the transmission of the data packet until the multi-drop bus becomes available for the integrated circuit to send the data packet. The data packet includes a data field to include time delay information caused by the unsuccessful arbitration attempt. A receiving integrated circuit may determine the time that the data packet would have been sent out from the transmitting integrated circuit absent the unsuccessful arbitration attempt based on the delay information.

Embodiments also relate to a synchronization generator circuit in an integrated circuit that generates timing signals indicating times at which periodic events occur at another integrated circuit. The synchronization generator circuit receives event timing information derived from data packets that indicate when periodic events occurred at the other integrated circuit. The synchronization generator circuit is set to generate the timing signals based on the event timing information. A component that receives event timing information separate from the synchronization generator circuit may send an adjustment request to update the setting of the synchronization generator circuit so that the deviation of the timing signals and actual times at which the period events do not exceed a threshold.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition to or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional image sensors 164 as the rear cameras of device 100.

Example Communication System in Electronic Device

Figure 2:
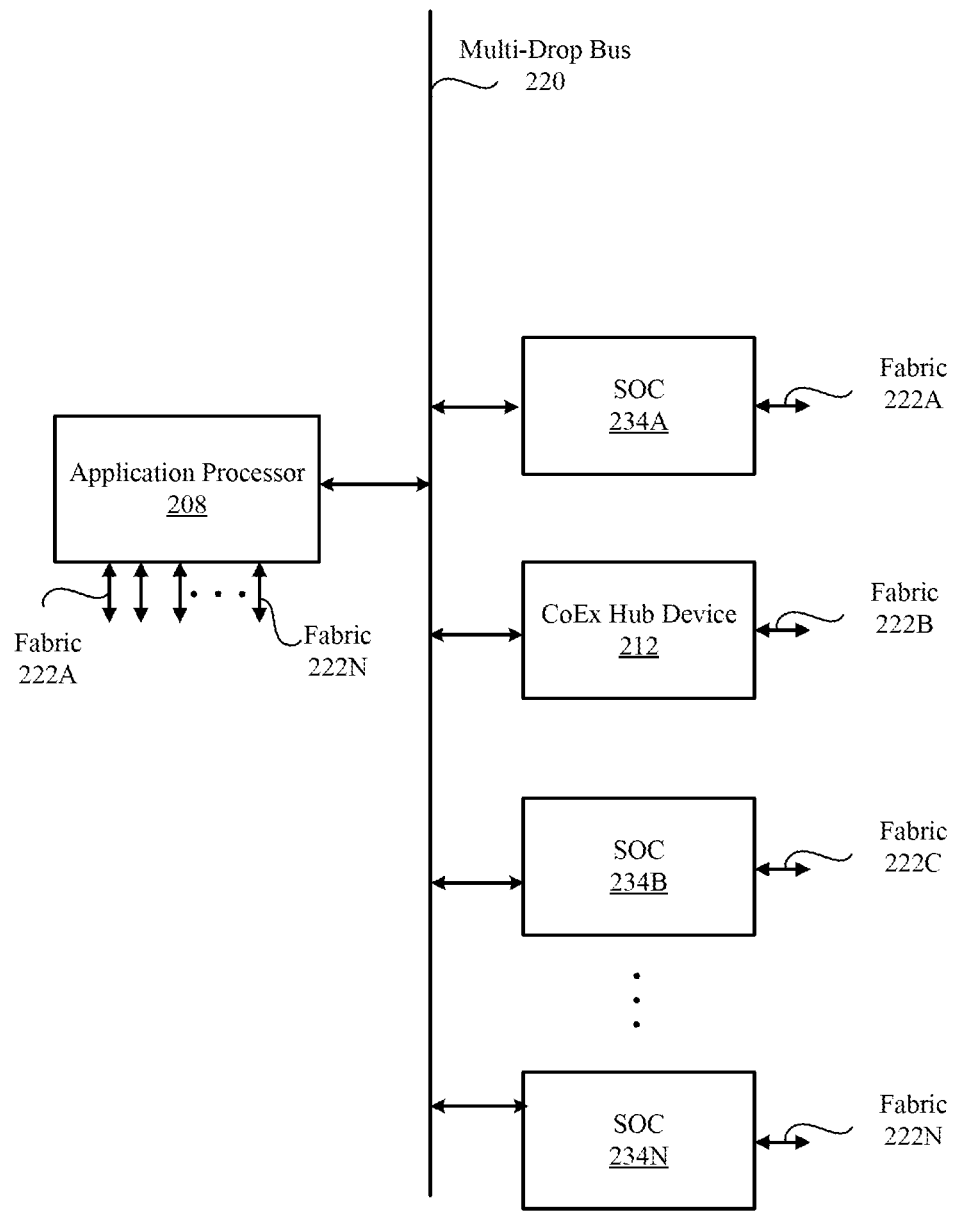
FIG. 2 is a block diagram illustrating components of the electronic device communicating over a multi-drop bus, according to one embodiment.

FIG. 2 is a block diagram illustrating components of electronic device 100 communicating over multi-drop bus 220, according to one embodiment. Electronic device 100 may include, among other components, an application processor 208 (also referred to as "a central processor" herein), a coexistence hub device 212 (also referred to as "a coexistence hub device" herein), SOCs 234A through 234N (collectively referred to as "SOCs 234" herein), a multi-drop bus 220, and fabrics 222A through 222N. The components illustrated in FIG. 2 may be part of a communication system in electronic device 100. Electronic device 100 may include additional components (e.g., user interfaces) not illustrated in FIG. 2.

Application processor 208 is a processing circuit in electronic device 100 for executing various operations. Application processor 208 may include one or more processing cores for executing various software programs as well as dedicated hardware circuits for performing specialized functions such as processing images, performing security operations, performing machine learning operations, and processing audio signals. Application processor 208 may also execute operations to coordinate the operations of other components in electronic device 100 including coexistence hub device 212 and SOCs 234. Application processor 208 can operate in multiple power modes including a low power mode where application processor 208 turns off most of its components to save power consumption, and a high-power mode where most of its components are active. Application processor 208 may also incorporate one or more communication components (e.g., cellular modem) that may also be embodied as a separate SOC. In one or more embodiments, application processor 208, in the low power mode, relays data between components connected over multi-drop bus 220. For this purpose, application processor 208 may (i) receive a signal from a device (e.g., SOCs 234 and coexistence hub device 212) over multi-drop bus 220, (ii) modify or copy the received signal according to a predetermined rule, and (iii) send the modified signal to another device (e.g., SOCs 234, and coexistence hub device 212) over multi-drop bus 220 to enable the SoCs 234 to communicate effectively.

Coexistence hub device 212 is a circuit or a combination of circuit and software that coordinates the operations of the communication system (including, e.g., coexistence hub device 212 and SOCs 234) and related components in electronic device 100. For this purpose, coexistence hub device 212 stores and executes an operation policy for defining and/or coordinating the operations of the communication system and the related components. Coexistence hub device 212 may operate based on the operation policy without further intervention or with reduced intervention by application processor 208. The operation policy may for, example, determine real time operations of components in the communication system based on factors such as operating conditions of the communication system, the length of time a communication subsystem remained in a waiting state, power consumption of each communication subsystem, and conditions of channels used by communication subsystems. Based on the operation policy, coexistence hub device 212 performs operations in advance to set up or prepare communication subsystems to activate or deactivate so that activation or deactivation communication subsystems occur without any error. The SoCs in an aggressor-victim pairing benefit from knowing when events are due to occur and being able to observe how long the events are likely to last because a victim SOC can plan ahead for the events. Coexistence hub device 212 may also include one or more communication subsystems that perform communication operations over various physical interfaces. By locally performing such coexistence operations at the communication subsystem, application processor 208 may be retained in the low power mode for a longer time despite activities in the communication subsystem, and also frees the resources of application processor 208 during its high-power mode. The details of coexistence hub device 212 is described below in detail with reference to FIGS. 3 and 4. Coexistence hub device 212 may also perform functions other than coordinating the operations that were performed by application processor 208.

Each of SOCs 234 is a circuit, by itself or in conjunction with software or firmware, that performs operations for communicating with one or more external networks or devices using communication protocols or security protocols. Each of SOCs 234 and coexistence hub device 212 may handle different communication protocols and/or are associated with different wireless bands. For example, SOC 234A may perform processing for long range communication (e.g., cellular communication) while SOC 234B or coexistence hub device 212 handles short range communication (e.g., Bluetooth communication). The operations of the SOCs 234 are at least partially controlled by coexistence hub device 212. An example of SOC 234B is described below in detail with reference to FIG. 5.

Fabrics 222 are communication channels enabling components in the communication system to communicate with application processor 208. One or more of fabrics 222 may be embodied as point-to-point connections such as Peripheral Component Interconnect Express (PCIe), I2C, or Serial Peripheral Interface (SPI). As illustrated in FIG. 2, SOC 234A, coexistence hub device 212 and SOCs 234B through 234N communicate with application processor 208 via corresponding fabrics 222A through 222N. One or more of fabrics 222 may have high bandwidth and low latency compared to multi-drop bus 220. Fabrics 222 illustrated in FIG. 2 may be physically separate communication channel or one or more shared physical channel with multiple logical sub-channels.

Multi-drop bus 220 is a communication channel that enables multiple components to communicate over a shared connection. Multi-drop bus 220 may be used primarily to transmit various messages including, but not limited to, data packets, timing packets and coexistence messages between components in the communication system. The data packets described herein refer to messages that include data for processing by devices connected to multi-drop bus 220 such as SOCs 234 and coexistence hub device 212. The timing packets described herein refer to messages that indicates times when periodic events occur at one of SOCs 234 or coexistence hub device 212. The coexistence messages refer to messages for coordinating operations between SOCs 234 and coexistence hub device 212. In one or more embodiments, System Power Management Interface (SPMI) is used to embody multi-drop bus 220. Other serial bus interfaces such as I2C may be used instead of the SPMI to embody multi-drop bus 220. Although only a single multi-drop bus 220 is illustrated in FIG. 2, two or more multi-drop buses may be used.

Although not illustrated in FIG. 2, coexistence hub device 212 may also control the operations or access to one or more antennas (not shown) associated with the communication system.

Example Architecture of Coexistence Hub device

Figure 3:
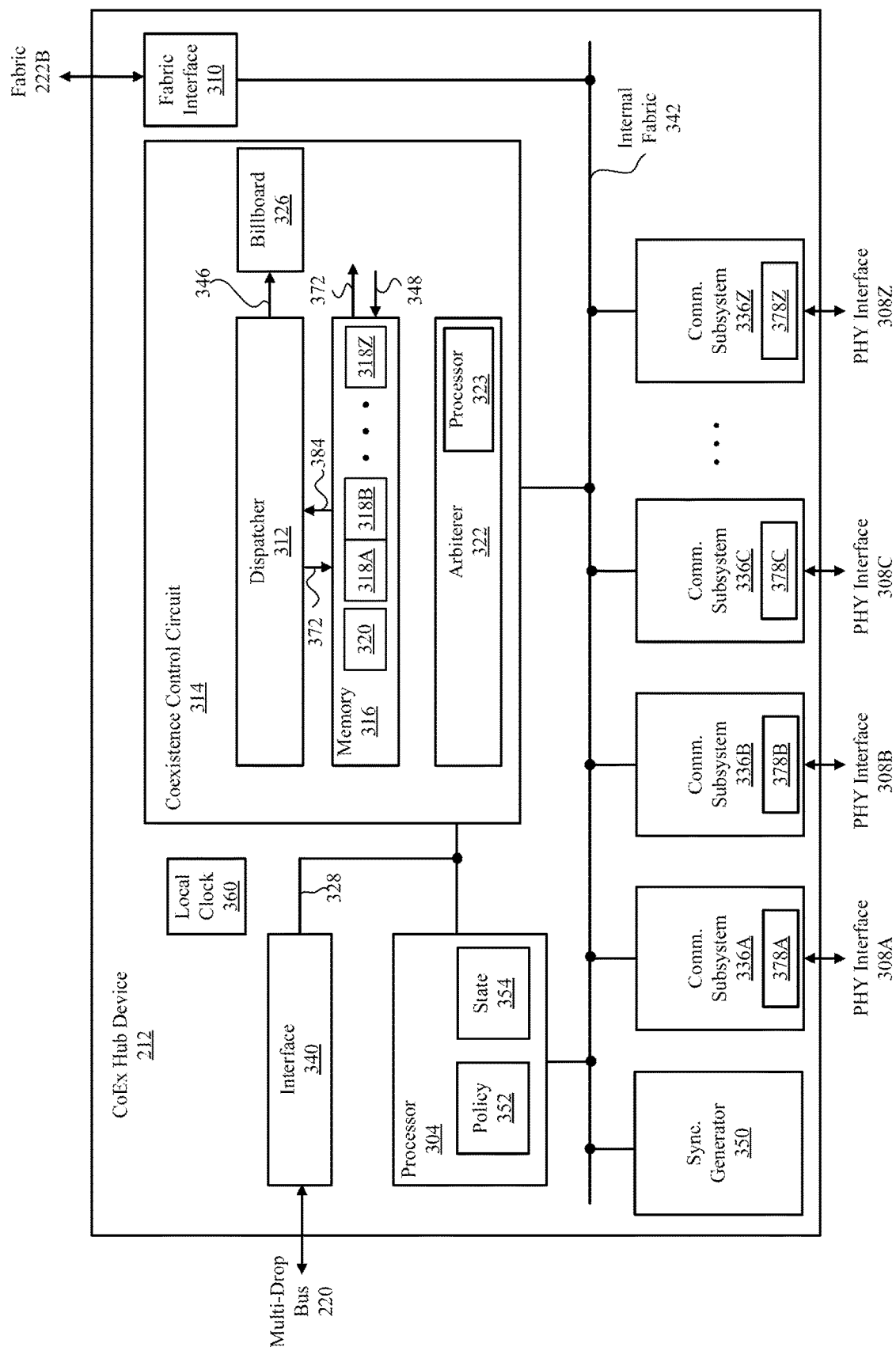
FIG. 3 is a block diagram illustrating a coexistence hub device, according to one embodiment.

FIG. 3 is a block diagram illustrating coexistence hub device 212, according to one embodiment. Coexistence hub device 212 is part of the communication system that coordinates operations of components in the communication system. Coexistence hub device 212 may also handle communication over protocols that are distinct from or partly overlap with communication performed by SOCs 234.

For this purpose, coexistence hub device 212 may include, among other components, processor 304, coexistence control circuit 314, fabric interface 310, multi-drop interface 340, communication subsystems 336A through 336Z (collectively referred to as "communication subsystems 336"), internal fabric 342, local clock 360 and synchronization generator 350. Coexistence hub device 212 may include additional components not illustrated in FIG. 3 or may omit components illustrated in FIG. 3 (e.g., one or more of communication subsystems 336).

Processor 304 is a circuit, by itself or in conjunction with software or firmware, that controls the overall operation of the coexistence hub device 212 as well as coordinating operations of other SOCs 234 using coexistence messages. Processor 304 may include memory to store operation policy 352 for controlling the operations. The operation policy 352 may be received from application processor 208 via fabric 222B, fabric interface 310 and internal fabric 342. After receiving the operation policy 352, processor 304 may decode the operation policy 352 and program other components in coexistence hub device 212 (e.g., coexistence control circuit 314), if applicable, to enforce the operation policy 352. Additional information related to the operation policy 352 may also be received from application processor 208. Such additional may be stored or processed at processor 304 to affect how the operation policy 352 is implemented. Furthermore, processor 304 may send a portion of the operation policy 352 relevant to other SOCs 234, via multi-drop bus 220, to program SOCs 234 to operate according to the operation policy 352. The processor 304 may make coexistence decisions according to the operation policy 352 by analyzing coexistence messages (e.g., state information or requests) received via interface 340 from SOCs 234 and communication subsystems 336. The processor 304 may stores current states 354 of communication subsystems 336 in the coexistence hub device 212 and the other SOCs 234. Current states 354 may include, for example, radio frequency (RF) bands/channels and bandwidths of those channels in active use by SOCs 234 and coexistence hub device 212, transmission power of radio signals and the exact frequencies and bandwidths being used for the transmitted signals. Such information may also be sent to application processor 208 or other SOCs 234 to enable real-time adjustment of operations in other SOCs 234. Processor 304 may delegate some coordination operations (e.g., coordination for communication subsystems 336) to arbiterer 322.

The operation policy as described herein refers to scenarios of operating combinations in the communication system that may be problematic or combinations of components having interworking issues, and also a set of rules that define the operations to be taken by SOCs 234 and coexistence hub device 212 to resolve or cope with such problematic scenarios. In other embodiments, the operation policy may include firmware code and enable dynamic response to maintain a balanced operation between multiple communication subsystems.

Each of communication subsystems 336 includes a circuit to process signals received from or for sending to corresponding physical layer interfaces 308A through 308Z (collectively referred to as "physical layer interfaces 308") external to coexistence hub device 212. Such circuits may include local processors 378A through 378Z (collectively referred to as "local processors 378") that perform one or more of the following operations: (i) execute commands associated with certain communication protocols, (ii) process received input communication signals according to a corresponding protocol to decode the input radio signals and respond by encoding certain responses within required time budgets on the RF link, (iii) control an associated radio frequency (RF) path to adjust transmit power or receive gain control, and (iv) configure, disable or enable components in the communication subsystem 336 based on the operation policy. All local processors 378 or at least a subset of these local processors 378 may be initialized (e.g., by application processor 208 or automatically) when coexistence hub device 212 is initialized. Among other things, the local processors 378 are programmed with a portion of the operation policy relevant to the operations of their communication subsystems 336. The operation policy downloaded to a local processor 378 of a communication subsystem 336 may define how the communication subsystem 336 should operate (e.g., the data rate of the communication subsystem, turning on or off of components in the communication subsystem 336, and changing the number of active transmitters). Alternatively, the relevant portion of the operation policy may be sequentially downloaded and programmed directly by application processor 208 through fabric 222B or processor 304 as each of communication subsystems 336 are turned on. One or more of communication subsystems 336 may communicate with physical layer interfaces (e.g., RF devices) via, for example, Radio Frequency Front-End Control Interface (RFFE).

In some embodiments, physical layer interfaces 308 may be merged into a reduced set where a local processor 378 supports more than one communication protocols or switch between different communication protocols over time. Local processor 387 may control a fixed set of radio paths or only front end switches, LNAs or PAs may be controlled by physical layer interfaces 308.

Interface 340 is a circuit or combinations of a circuits and software for communication with multi-drop bus 220. In one or more embodiments, interface 340 includes circuit components for processing data into outbound packets for sending over multi-drop bus 220, and unpacking inbound packets received from multi-drop bus 220 into data for processing in coexistence hub device, as described below in detail with reference to FIG. 4B. The interface 340 is connected to processor 304 and coexistence control circuit 314 via connection 328.

Fabric interface 310 is a circuit or a combination of a circuit and software for enabling coexistence hub device 212 to communicate with application processor 208 over fabric 222B. Fabric interface 310 is also referred to as an internal communication channel herein. In one or more embodiments, fabric interface 310 performs operations such as buffering, segmenting/combining data, serializing/deserializing and packaging/unpacking of data for communication over a point-to-point communication channel (e.g., PCIe). As illustrated in FIG. 3, fabric interface 310 is connected to internal fabric 342 to enable communication of components in coexistence hub device 212 with application processor 208.

Local clock 360 is hardware or a combination of hardware and software for generating local clock signal 472 for tracking time within coexistence hub device 212. The clock signal may oscillate between a high state and a low state, and is used for coordinating timing of actions/events within coexistence hub device 212. Coexistence hub device 212 may also receive global clock signal 474 from a global clock outside coexistence hub device 212 via fabric 222B or multi-drop bus 220. Global clock signal 474 is a signal that is used across different components in electronic device 100 to coordinate timing of actions/events of the different components.

Synchronization generator 350 is hardware or a combination of hardware and software for generating timing signals that indicate times at which periodic events or non-periodic events occur at one or more SOCs 234 outside coexistence hub device 212. Synchronization generator 350 may send out the timing signals over internal fabric 342 to other components of coexistence hub device 212. The timing signals are used, for example, to coordinate timing of events/actions at communication subsystems 336 according to the events at one or SOCs external to synchronization generator 350. The timing signals may synchronize a global time across one or more SOCs 234 and coexistence hub device 212 so that their operations can be coordinated using the global time. Details of synchronization generator 350 is described below with reference to FIG. 4D.

Coexistence control circuit 314 is a circuit, by itself or in conjunction with software, that processes coexistence messages transmitted over multi-drop bus 220. Coexistence control circuit 314 is programmed by processor 304 to enforce the operation policy 352 by making real time decisions on coexistence events, distribute inbound coexistence messages to relevant communication subsystems 336, sharing real time coexistent messages among communication subsystems 336 and sending outbound coexistence messages to other SOCs 234. The coexistence event described herein refers to a condition or occurrence defined by the operation policy that would prompt coordinating of operations in components of electronic device 100.

Specifically, coexistence control circuit 314 may include, among other components, dispatcher 312, memory 316, arbiterer 322 and billboard 326. Dispatcher 312 is a programmable circuit or a circuit in combination with software or firmware for filtering and sending messages for each communication subsystems 336 to memory 316. The details of the dispatcher 312 and its functions are described below with reference to FIG. 4A.

Memory 316 has multiple buffers 318A through 318Z (collectively referred to as "buffers 318") where each buffer corresponds to each of communication subsystems 336. Each of buffers 318 receives and stores inbound messages (received from components outside coexistence hub device 212 via multi-drop bus 220) relevant to a corresponding communication subsystem 336. The stored inbound coexistent messages in a buffer 318 may be sent to a corresponding communication subsystem 336 (as indicated by arrow 372) based on priority (e.g., time sensitive data has a higher priority relative to time insensitive data) via an internal fabric 342. If one or more communication subsystems 336 are inactive, buffers 318 stores the messages until the communication systems 336 are turned on and become available to receive the messages. In one or more embodiments, different buffers 318 may be associated with different priorities. When a buffer assigned with high priority is filled with a message, a communication system 336 may wake up to service to ensure that the message is handled in a timely manner. Each of buffers 318 also stores outbound messages 348 (received from a corresponding communication subsystem 336 via internal fabric 342). The outbound messages are retrieved by dispatcher 312 and sent out over multi-drop bus 220 to components outside coexistence hub device 212, also based on priority (e.g., time sensitive data has a higher priority relative to time insensitive data).

Memory 316 also includes shared memory section 320 that may be accessed by arbiterer 322 to resolve conflicting use of resources and by different local processors 378 to exchange time-sensitive messages among communication subsystems 336. Communication subsystems 336 may submit their tasks along with requests from other SOCs 234 to memory queues to be serviced by arbiterer 322.

Billboard 326 is a circuit, by itself or in conjunction with software or firmware, that stores state information of communication subsystems 336. The status information 346 is received from communication subsystems 336 and stored for access. Billboard 326 enables a communication subsystem in the coexistence hub device 212 or an external component to accurately determine operating context of another system by accessing the state information in billboard 326. In one or more embodiments, other SoCs 234 may also include billboards that enable SOCs 234 to advertise their context concurrently. The billboard may include a memory region (e.g., a subdivision of the memory) so that multiple SOCs can share their own subset of the memory to post context information. An incoming message into the memory region of the billboard may trigger a communication subsystem to respond within a predetermined time via an interrupt when the message transaction is complete. In one or more embodiments, billboard 326 is also be used as a ping-pong buffer for exchanging signals or data between SOCs 234 over multi-drop bus 220 if SOCs 234 cannot perform direct messaging among themselves for some reasons.

Arbiterer 322 is a circuit, by itself or in conjunction with software or firmware, that makes decisions on real time coordination of operations of communication subsystems 336 and sends out the decisions to the communication subsystems 336 over internal fabric 342 and memory 316. Such decisions may include resolving competing needs of common resources by multiple communication subsystems 336 or requests for incompatible resources by different communication subsystems 336. Arbiterer 322 makes the decisions in real time, which may remain effective for a shorter time period compared to decisions made at processor 304 to implement the operation policy 352. In addition, arbiterer 322 may resolve requests for use of resources by external communication subsystems that compete with the local communication subsystems 336 for use of the same resource. For this purpose, arbiterer 322 may access current states 354 of communication subsystems 336 and the other SOCs 234 stored in processor 304 as well as using information about the priority of the different competing operations. The algorithm for resolving the resource conflicts at arbiterer 322 may be adjusted based on the operation policy 352 executed by processor 304. Arbiterer 322 may be programmed by processor 304 or application processor 208. The decision made by arbiter 322 may include controlling RFFE transactions associated with communication subsystems 336, for example, to change the settings of an external RF device. Such operation may include blanking a power amplifier transmission of corresponding communication subsystem 336. Because the real-time decisions are sent out over shared internal fabric 342, a communication subsystem (e.g., communication subsystem 336A) may receive the decisions intended for another communication subsystem (e.g., communication subsystem 336B) and adjust its operations accordingly. Arbiterer 322 may include processor 323 to control the overall operation of arbiterer 322.

In one or more embodiments, processor 304 determines a larger scale coordination operation based on its operation policy 352, and configures components of coexistence control circuit 314, communication subsystems 336 and possibly SOCs 234 to enforce the operation policy 352. Arbiterer 322, on the other hand, coordinates a smaller scale, real time coexistence operations that are consistent with the larger scale coordination operation as defined by operation policy 352.

The components of coexistence hub device 212 illustrated in FIG. 3 are merely illustrative. Coexistence hub device 212 may include fewer components (e.g., lack memory 316 or separate processor 304) or include additional components (e.g., general purpose input/output) not illustrated in FIG. 3.

Example Architecture of Dispatcher

Figure 4A:
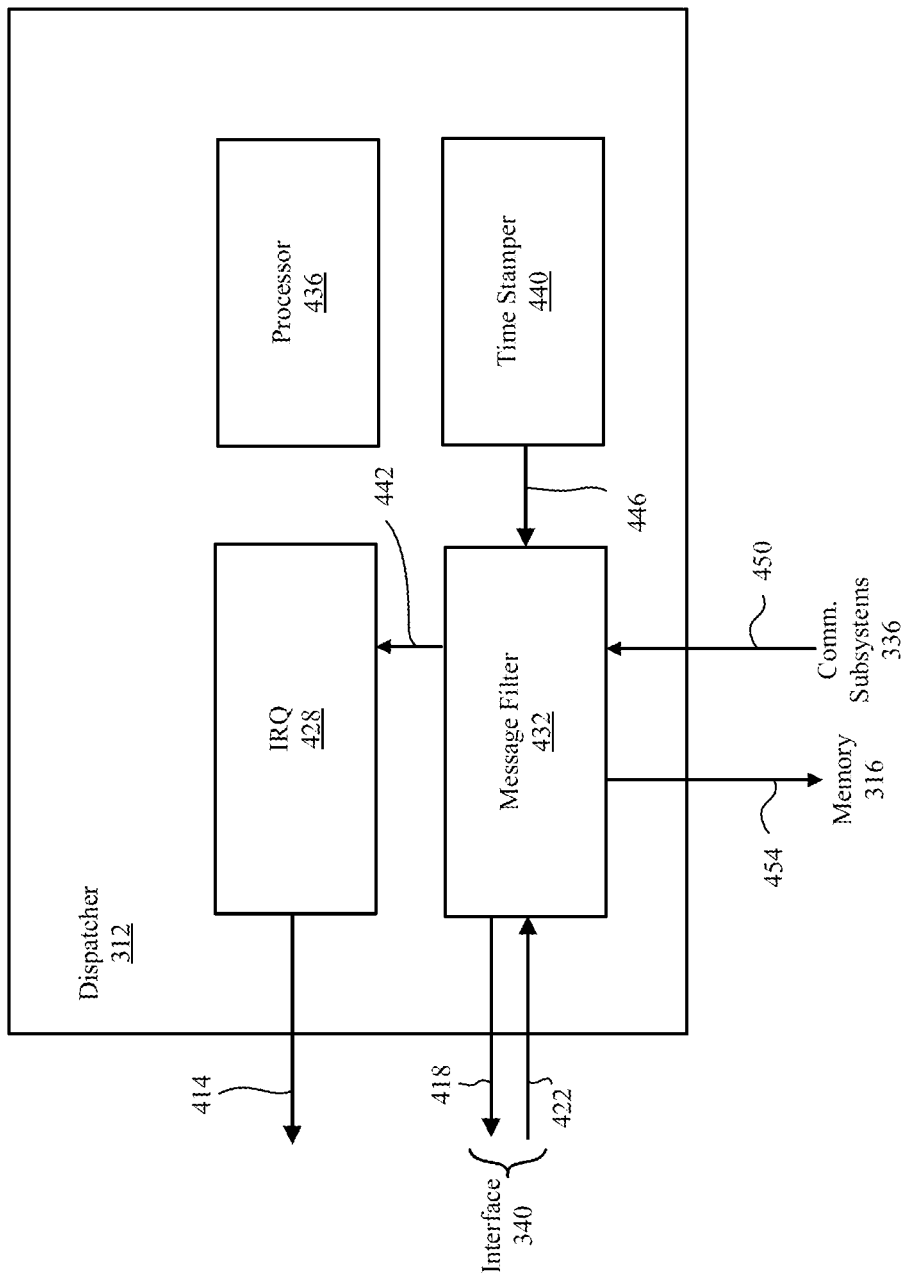
FIG. 4A is a block diagram of a dispatcher in the coexistence hub device of FIG. 3, according to one embodiment.

FIG. 4A is a block diagram of dispatcher 312 in coexistence hub device of FIG. 3, according to one embodiment. Dispatcher 312 is a circuit or a combination of circuit, software and/or firmware for processing messages. Dispatcher 312 determines when outbound messages from communication subsystems 336 should be sent to the processor 304 or SOCs 234, and when the time arrives, forwards the outbound messages to interface 340 for sending over multi-drop bus 220. The times for sending the outbound messages are determined based on the priority of the outbound messages, whether other messages are remaining in the memory 316 for sending over multi-drop bus 220, and when arbitration for using multi-drop bus 220 for transmitting data is successful. Dispatcher 312 also receives messages from SOCs 234 over multi-drop bus 220 and forward them to the communication subsystems 336 over internal fabric 342. The dispatcher may forward these messages based on a predefined set of rules to pertinent communication subsystems 336. Further, dispatcher 312 may also filter out some messages which are not marked as being of interest to any of the active communication subsystems 336.

Dispatcher 312 may include, among other components, processor 436, interrupt manager 428, time stamper 440 and message filter 432. One or more of interrupt manager 428, time stamper 440 and message filter 432 may be embodied as firmware of software executed by processor 436. Also, additional components may be added to dispatcher 312.

Processor 436 is a circuit that may perform various operations in dispatcher 312 such as (i) managing contending resources within each communication subsystem 336, (ii) control external RF control blocks outside of coexistence hub device 212, (iii) support the functions and operations of arbiterer 322, and (iv) coordinating reporting of the results from arbiterer 322 to components on the multi-drop bus 220. Processor 436 may be a part of processor 304 or it may be a standalone processor. Processor 436 may also update the operations of other components in dispatcher 312 over time or depending on the activities in electronic device 110.

Message filter 432 is hardware, software, firmware or a combination thereof that receives inbound messages 422 from multi-drop bus 220 via interface 340, filters inbound messages 422 for relevancy to communication subsystems 336, and sends the filtered inbound messages 454 to appropriate buffers 318 and/or shared section 320 of memory 316. Message filter 432 may also redirect the inbound messages 454 to buffers associated with communication subsystems 336 other than a default communication subsystem 336 to ensure that the active communication subsystems 336 receives all relevant inbound messages. By configuring message filter 432, a communication subsystem (e.g., 336A) may receive an inbound intended for another communication subsystem (e.g., 336B) as well and take such inbound message into account for its operation. If an inbound message includes an interrupt, the message filter 432 sends the corresponding coexistence message 442 to interrupt manager 428.

Interrupt manager 428 is hardware, software, firmware or a combination thereof that manages interrupts. When interrupt manager 428 receives the coexistence message 442 including an interrupt, interrupt manager 428 extracts the interrupt and sends out an interrupt signal 414 to corresponding communication subsystem 336. The interrupt signal 414 can cause the corresponding communication subsystem 336 to shut down, power down a subset of its components, wake-up from a power down mode or indicate real time state of components on multi-drop bus 220 (e.g., SOCs 234). These interrupt signals may only involve a simple decoder and no microprocessor, which enables low cost components to send interrupt signals for communicating a simple message over multi-drop bus 220. These interrupts can also be used as system status indicators for external SOCs or components. One of the characteristics of the interrupt signals is that they are sticky, meaning that even if an SOC (e.g., SOC 234B) is asleep when a coexistence hub device 212 sends an interrupt signal, the SOC (e.g., SOC 234B) will respond to the interrupt signal after the SOC (e.g., SOC 234B) wakes up at a later time. These interrupt signals can also be used to guarantee that an external SOC (e.g., SOC 234B) may abruptly go to inactive/sleep state without requiring other components (e.g., SOC 234A) to stay awake long enough to complete handshake operations with the SOC (e.g., SOC 234B). By using always on interrupt signals, the burden on the originating message source may be reduced.

Message filter 432 may also receive interrupt signal 450 from communication subsystems 336. If the interrupt signal 450 is intended for SOCs 234, message filter 432 sends the interrupt 450 as an outbound coexistence message 418 to interface 340 for sending out via multi-drop bus 220. An interrupt signal between the communication subsystems 336 is transmitted over internal fabric 342 without intervention of coexistence control circuit 314.

Time stamper 440 is a circuit that keeps track of time for incoming and outgoing messages on multi-drop bus 220. Time stamper 330 tracks the actual time the messages are sent or received to account for arbitration delays, for example, using local clock signal 472 and/or global clock signal 474.

Example Architecture of Interface 340

Figure 4B:
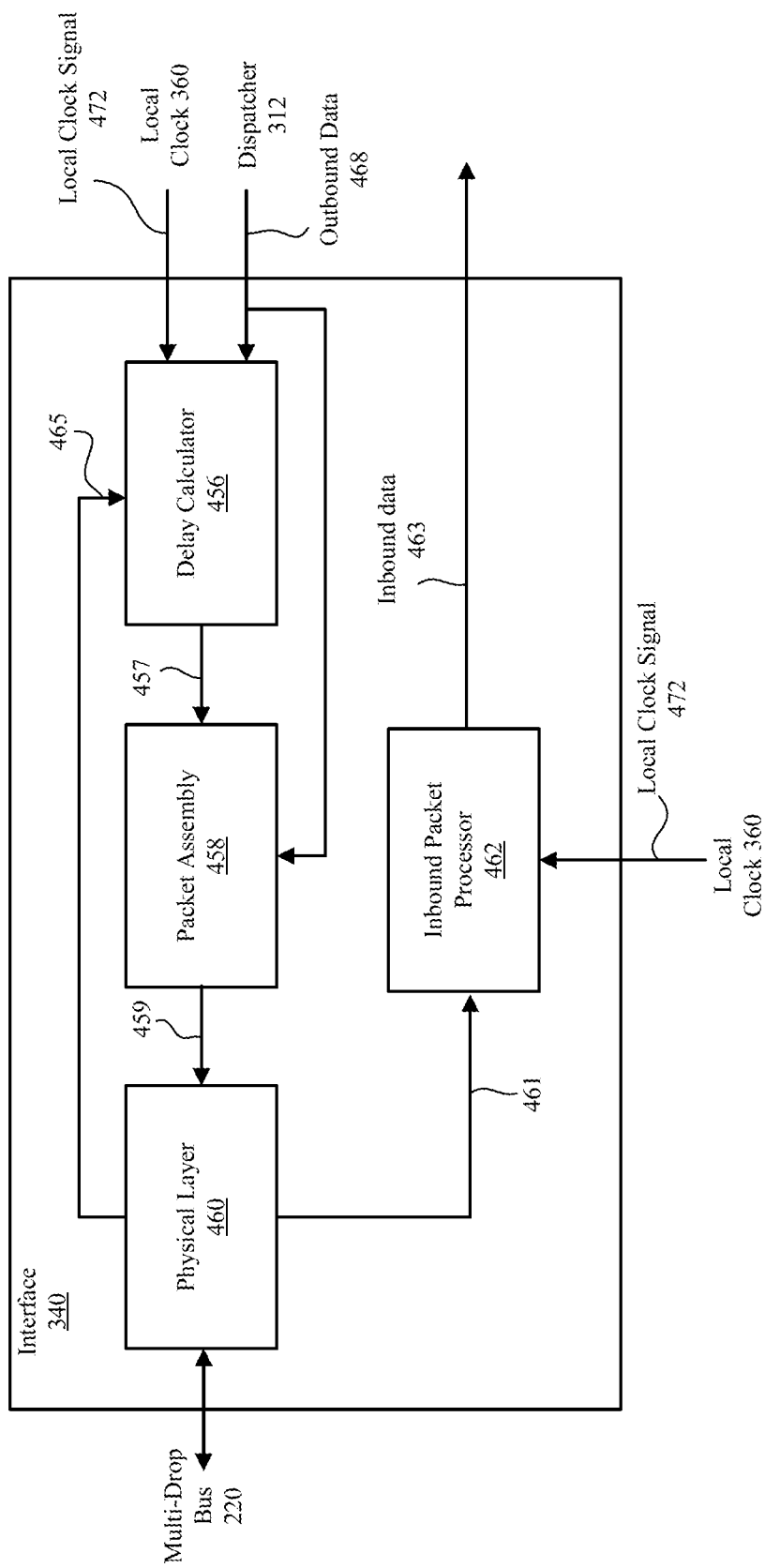
FIG. 4B is a block diagram of an interface for communication over the multi-drop bus, according to one embodiment.

FIG. 4B is a block diagram of interface 340, according to one embodiment. Interface 340 generates outbound data packets 459 from outbound data 468 received from dispatcher 312 as well as depacketizes inbound data packets 461 to generate inbound data 463. For this purpose, interface 340 may include, among other components, delay calculator circuit 456, packet assembly circuit 458, physical layer circuit 460, and inbound packet processor 462. Interface 340 may include further components not illustrated in FIG. 4B such as buffers.

Delay calculator circuit 456 is a circuit or a combination of a circuit and software that determines delay time 457 indicating the amount of time delayed for sending outbound data packet 459 due to the arbitration process associated with the use of multi-drop bus 220 to transmit outbound data packets 459. The delayed time may be a difference between (i) an earliest possible transmission time when the outbound data packet 459 could have been transmitted over multi-drop bus 220 with an earliest arbitration attempt to transmit over multi-drop bus 220 being successful, and (ii) an actual time when outbound data packet 459 is actually sent out over multi-drop bus 220 with at least one failed arbitration attempt and subsequent successful arbitration attempt to transmit outbound data packet 459. To determine the delay time, delay calculator circuit 456 receives local clock signal 472, outbound data 468 from dispatcher 312, and arbitration result 465 from physical layer circuit 460. Delay calculator circuit 456 also determines an identification of outbound data 468 so that delay time 457 may be applied to a correct outbound data packet 459 associated with outbound data 468.

If the first arbitration attempt to transmit an outbound data packet 459 associated with outbound data 468 is successful, a time delay value of zero or another value indicating no delay is output as time delay 457 by delay calculator circuit 456. If the first arbitration attempt is unsuccessful but subsequent arbitration is successful, a time delay value corresponding to the delayed arbitration success is output as time delay 457 by delay calculator circuit 456. The delay time 457 may be represented in terms of a local clock time or a global clock time derived from the local clock time and sends delay time 457 to packet assembly circuit 458. The global clock time may be derived at delay calculator circuit 456 by using relationships between the global clock time and the global clock time stored in delay calculator circuit 456.

By including a data field including the delay time in outbound data packet 459, a SOC 234 receiving outbound data packet 459 may determine when outbound data packet 459 would have been sent out from interface 340 if there was no delay associated with arbitration. Hence, despite the delay time in receiving outbound data packet 459 due to arbitration over the use of multi-drop bus 220, SOC 234 may perform desired actions or operations while compensating or taking into account the delayed time associated with the arbitration. Another advantage of embodiments is that the recipient SOC can reconstruct a timeline for when events of interest may occur on another SoC and can take actions ahead of time when these events are likely to occur in the future. In this way, the recipient SOC may proactively plan for future events. This mechanism can be used, for example, to supplement a message that was sent ahead of time to the recipient SOC, and by tracking the time the events occurred, and more accurately revise its interval state in anticipation of future unavailability of shared resources.

Packet assembly circuit 458 is a circuit that performs packetizing of outbound data 468 from dispatcher 312. In one embodiment, packet assembly circuit 458 starts the process of packetizing outbound data 468 as soon as the outbound data 458 is received from dispatcher 312. The packetizing includes the process of segmenting outbound data 468 into multiple parts as payloads and adding relevant header information to outbound data packets. One of header fields in the outbound data packets is a time delay field indicating delay time 457 for outbound data 468 received from delay calculator circuit 456.

Physical layer circuit 460 is a circuit or a combination of a circuit and software that performs various operations of transmitting outbound data packets and/or receiving bitstreams of input data packets over a physical data link. Operations performed by physical layer circuit 460 may include, among others, arbitrating the use of multi-drop bus 220 for transmitting the output data packets from coexistence hub device 212, converting the outbound data packet 459 into outbound bitstreams, and converting the received bitstreams over multi-drop bus 220 into inbound data packet 461.

Inbound packet processor 462 is a circuit or a combination of a circuit and software that converts inbound data packet 461 into inbound data 463 for transmission to other components of coexistence hub device 212. Operations performed by inbound packet processor 462 may include, among others, extracting the delay time of the inbound data packet 461 associated with failure of a source of inbound data bitstream to arbitrate the use of multi-drop bus 220 to transmit the inbound data bitstream over multi-drop bus 220. The extracted delay time and inbound data 463 may be sent to various components of coexistence hub device 212 for further operations or actions.

By extracting and identifying the delay time in inbound data packet 461, coexistence hub device 212 may determine when inbound data packet 461 would have been sent out from a source SOC absent a delay due to arbitration for transmitting data packets over multi-drop bus 220. Hence, components in coexistence hub device 212 can compensate for the delay time and perform appropriate operations.

The structure of interface 340 is merely illustrative. In other embodiments, interface 340 may have additional components or include fewer components. For example, interface 340 may process only transmittal of outbound data packet 459 and not include inbound packet processor 462. Further, one or more components of interface 340 may be combined into fewer components or split up into more components than what is described in FIG. 4B.

Figure 4C:
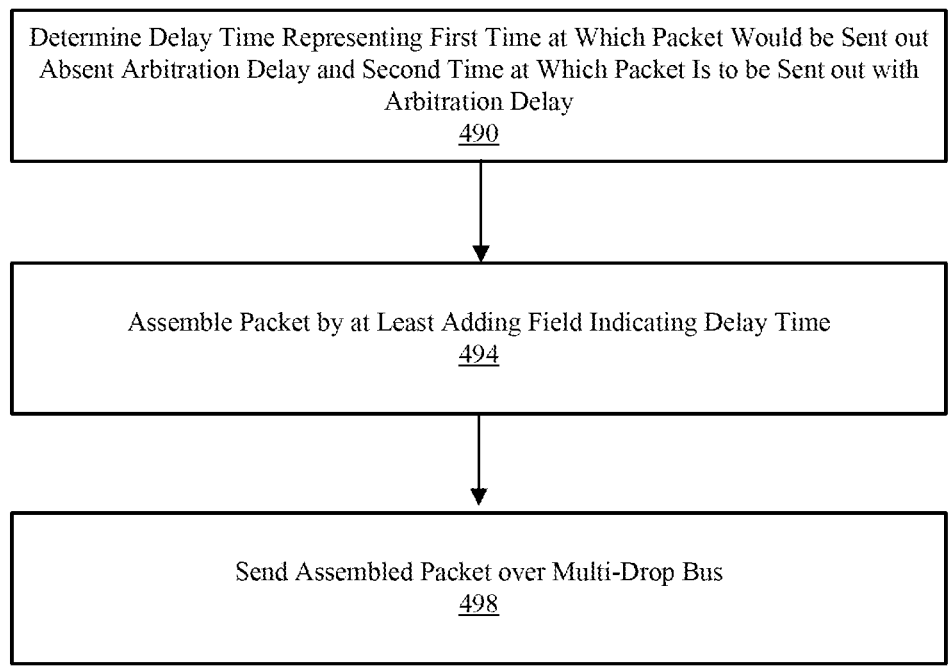
FIG. 4C is a flowchart illustrating a process of assembling an outbound data packet at the interface, according to one embodiment.

FIG. 4C is a flowchart illustrating a process of assembling an output data packet at interface 340, according to one embodiment. Delay calculator 456 determines 802 delay time representing a first time at which an outbound data packet would have been sent out from the source SOC absent delay due to arbitration, and a second time at which the outbound data packet is actually sent out with the arbitration delay.

Packet assembly circuit 458 assembles 806 the outbound packet by at least adding a field in the outbound packet indicating the delay time as determined by delay calculator 456. Physical layer circuit 460 sends 810 the assembled output packet over multi-drop bus 220.

Example Architecture of Synchronization Generator

Figure 4D:
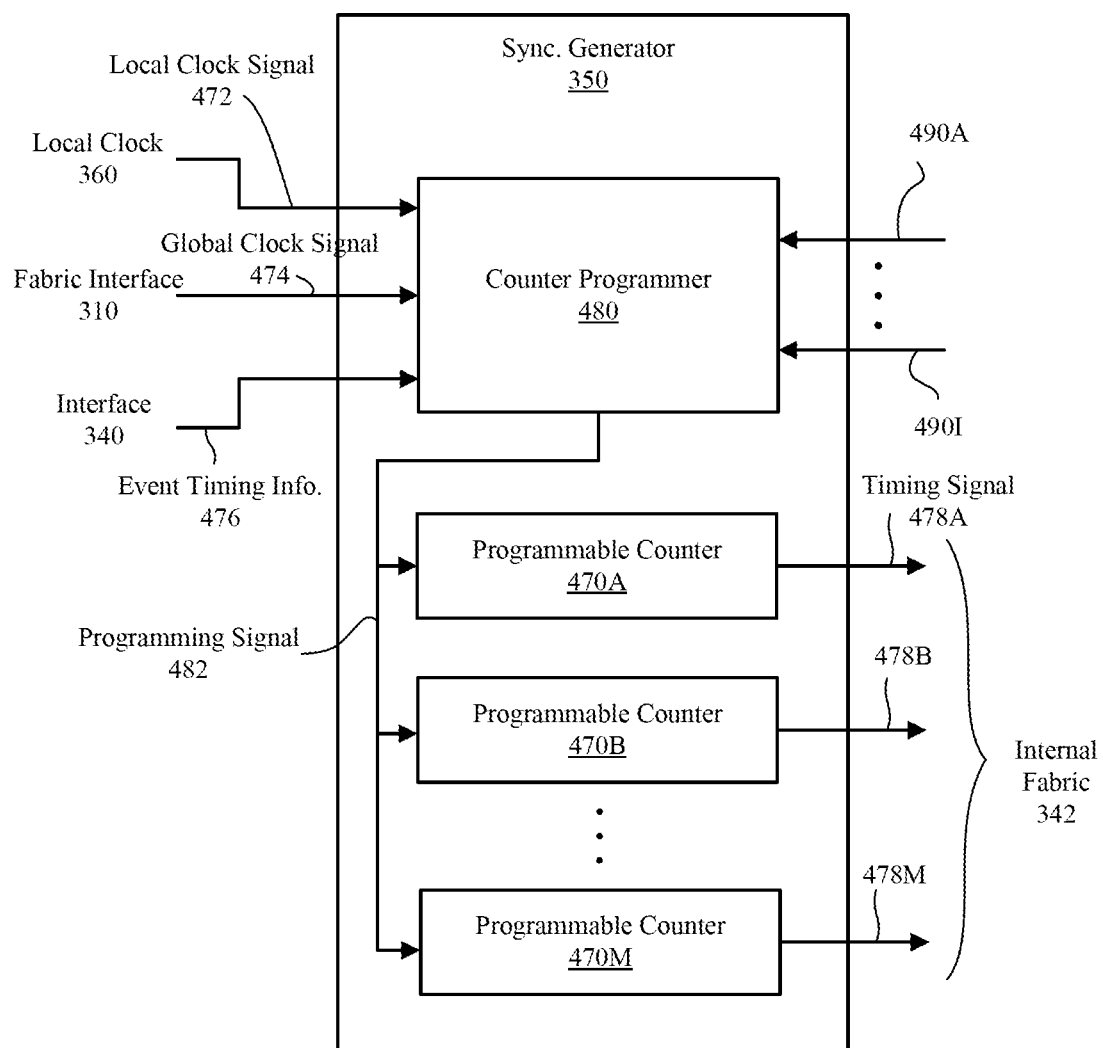
FIG. 4D is a block diagram of a synchronization generator, according to one embodiment.

FIG. 4D is a block diagram of synchronization generator 350, according to one embodiment. Synchronization generator 350 receives event timing information 476 indicating certain periodic events from one or more SOCs 234, and generates timing signals 478A through 478M (hereinafter collectively referred to as "timing signals 478") that are sent to other components of coexistence hub device 212 for coordinating various operations or actions. The timing signals 478 represent timing at which other periodic events occur at the one or more SOCs external to coexistence hub device 212.

For this purpose, synchronization generator 350 may include, among other components, a counter programmer 480 and a plurality of programmable counters 470A through 470M (hereinafter collectively referred to as "programmable counters 470"). Counter programmer 480 is logic, either in the form of a circuit or a combination of circuit and software, that programs programmable counters 470 by sending programming signal 482.

Counter programmer 480 receives local clock signal 472 from local clock 360, global clock signal 474 from a global clock source (e.g., application processor 208) through fabric 222 and fabric interface 310, and event timing information 476 from coexistence hub device 212 via multi-drop bus 220 and interface 340. Event timing information 476 is derived from inbound timing packets and indicates when periodic events occurs at the external SOC. In one embodiment, event timing information 476 is determined by interface 340 from a transmittal time at which an inbound data packet is transmitted from the SOC and then adjusting the transmittal time according to the delay time as indicated by the inbound timing packets.

Programmable counters 470 are circuits or combinations of circuits and software that are programmed to periodically generate timing signals 478. In one or more embodiments, the timing signals 478 are in the form of interrupts that are sent to other components of coexistence hub device 212 over internal fabric 342. Each of programmable counters may count cycles in local clock signal 472 to determine whether a certain amount of time has elapsed before sending out its timing signal 478. All of programming counters 470 may track times associated with the same events from the same SOC. Alternatively, one or more of programming counters 470 may track distinct and independent events from the same or different SOCs.

Counter programmer 480 may request adjustment requests 490A through 490I (hereinafter collectively referred to as "adjustment requests 490") from other components in coexistence hub device 212. Each of adjustment requests 490 may be generated by a component in coexistence hub device 212 to indicate that one or more timing signals 478 have deviated from accurate timing beyond a predetermined threshold and that corresponding programmable counters 470 should be adjusted to correct the deviation. Such adjustment request 490 may be prompted by a component in coexistence hub device 212 that tracks timing of the periodic events independent of the timing signals 478 and has more accurate event timing information than synchronization generator 350. For example, the component may communicate with an external SOC associated with the periodic events via fabric 222B or general purpose input/output (GPIO) (not shown). In response to receiving adjustment request 490, counter programmer 480 generates programming signal 482 for updating a corresponding programmable counter 470, and makes adjustments to the advances or delays time at which the corresponding programmable counter 470 generates subsequent timing signals, as described below in detail with reference to FIG. 7B. The adjustment request 490 may indicate the amount of time to be advanced or delayed in terms of local clock cycles or global time cycles.

In one or more embodiments, synchronization generator 350 programs its programmable counter to generate timing signals 478 indicating fractions of periods indicated by event timing information 476. For example, synchronization generator 350 may generate multiple timing signals of equal interval between two other timing signals, as described below in detail with reference to FIG. 7A. In this way, the number of inbound data packets indicating the timing of events at a SOC can be reduced while still providing all timing signals 478 that are relevant to timing the operations of the components of coexistence hub device 212.

Example Architecture of SOC

Figure 5:
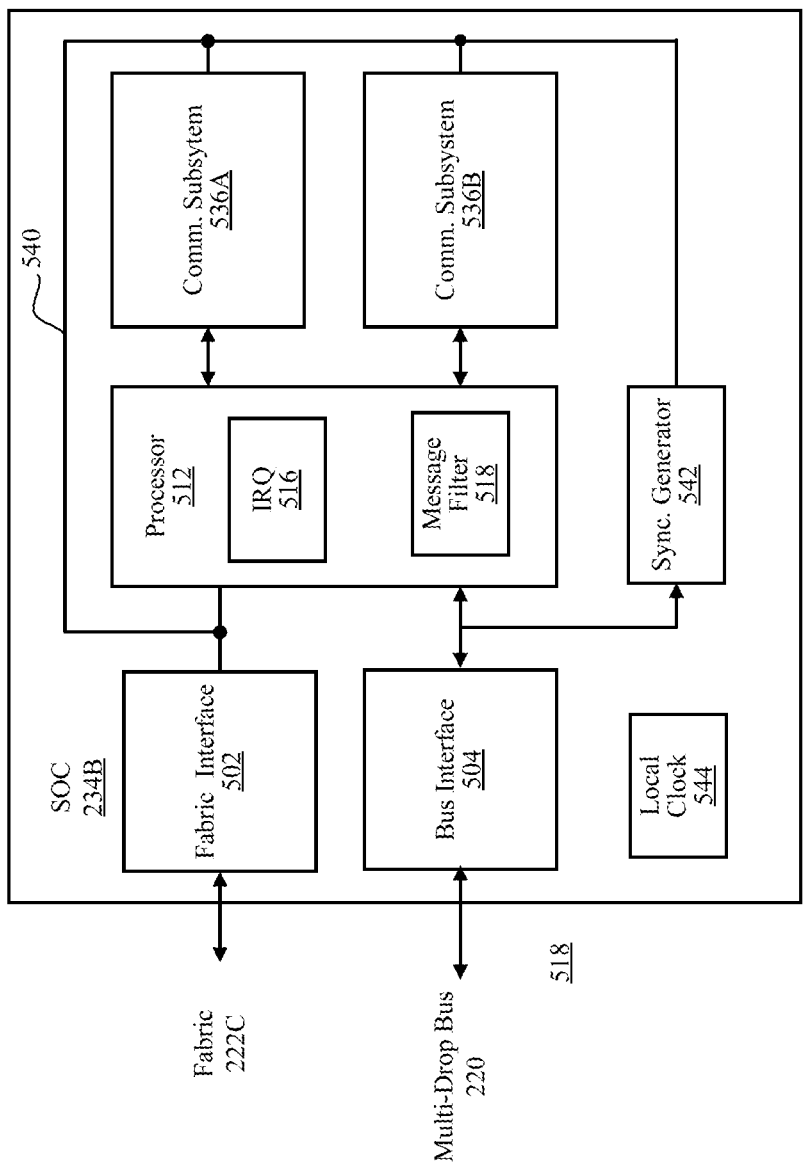
FIG. 5 is a block diagram of a system on chip (SOC) connected to the multi-drop bus, according to one embodiment.

FIG. 5 is a block diagram of SOC 234B, according to one embodiment. Although SOC 234B is illustrated in FIG. 5 as an example, other SOCs 234A, 234C through 234N may have the same or similar architecture as SOC 234B. SOC 234B may send messages to coexistence hub device 212 or other SOCs and/or receive messages from coexistence hub device 212 or other SOCs over multi-drop bus 220. Alternatively or in addition, SOC 234B may send messages including event timing information 476 to coexistence hub device 212 or other SOCs over multi-drop bus 220.

SOC 234B is part of the communication system in electronic device 100 and can execute one or more communication protocols using its communication subsystems 536A, 536B (collectively referred to as "communication subsystems 536"). Although only two communication subsystems 536A, 536B are illustrated in FIG. 5, more than two communication subsystems or only a single communication subsystem may be included in SOC 234B. Each of communication subsystems 536A, 536B may be associated with different communication protocols, or both may be associated with the same communication protocol. Communication subsystems 536 are substantially identical to communication subsystems 336 of coexistence hub device 212 except that messages associated with communication subsystems 536 are processed by processor 512 instead of coexistence control circuit 314. Communication subsystems 536 can send messages over multi-drop bus 220 to coexistence hub device 212 to coexist with communication subsystems in coexistence hub device and/or other SOCs. Inbound messages to SOC 234B are processed locally by processor 512 and sent to corresponding communication subsystems 536. Other detailed explanation on communication subsystems 536 is omitted herein for the sake of brevity.

In addition to communication subsystems 536, SOC 234B may further include, among other components, fabric interface 502, bus interface 504, processor 512, local clock 544, synchronization generator 542, and an internal bus 540 for connecting these components. SOC 234B may include further components such as memory for buffering coexistence messages associated with each communication subsystems 536.

Bus interface 504 is a circuit, by itself or in conjunction with software or hardware, that enables components of SOC 234B to communicate with coexistence hub device 212 and other SOCs over multi-drop bus 220. Bus interface 540 may perform the same function and have the structure as interface 340 described above with reference to FIG. 4B.

Fabric interface 502 is a circuit, by itself or in conjunction with software or hardware, that enables components of SOC 234B to communicate with application processor 208 over fabric 222C. The communication of fabric interface 502 is capable of transmitting data at faster speed and higher bandwidth than the communication over bus interface 504.

Processor 512 manages overall operation of SOC 234B. Processor 512 may include, among other components, interrupt manager 516 and message filter 518 as software or hardware components. The functions and operations of interrupt manager 516 and message filter 518 are substantially the same as those of interrupt manager 428 and message filter 432, and therefore, detailed explanation of these components is omitted herein for the sake of brevity.

Processor 512 and/or communication subsystems 536 may be programmed by processor 304 of coexistence hub device 212 or application processor 208 to implement operation policy 352. In one embodiment, such programming may be performed when the SOC 234B is turned on.

Local clock 544 and synchronization generator 542 may perform the same function and have the same structure as local clock 360 and synchronization generator 350 as described above with reference to FIGS. 3 and 4D except that local clock 544 and synchronization generator 542 are used in SOC 234 instead of coexistence hub device 212.

Example Delay Time for Arbitration

Figure 6A:
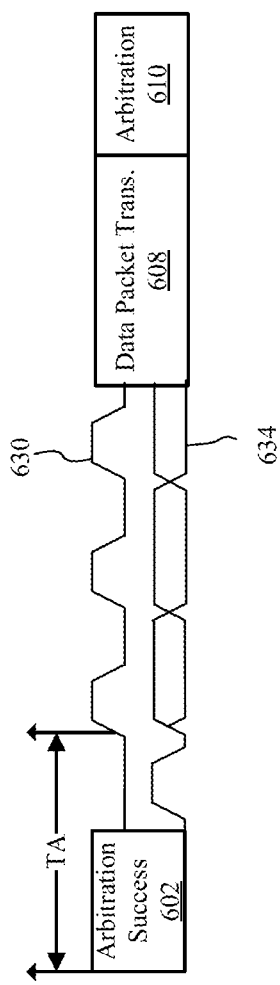
FIGS. 6A and 6B are timing diagrams illustrating a delay time associated with transmitting a data packet over the multi-drop bus, according to one embodiment.
Figure 6B:
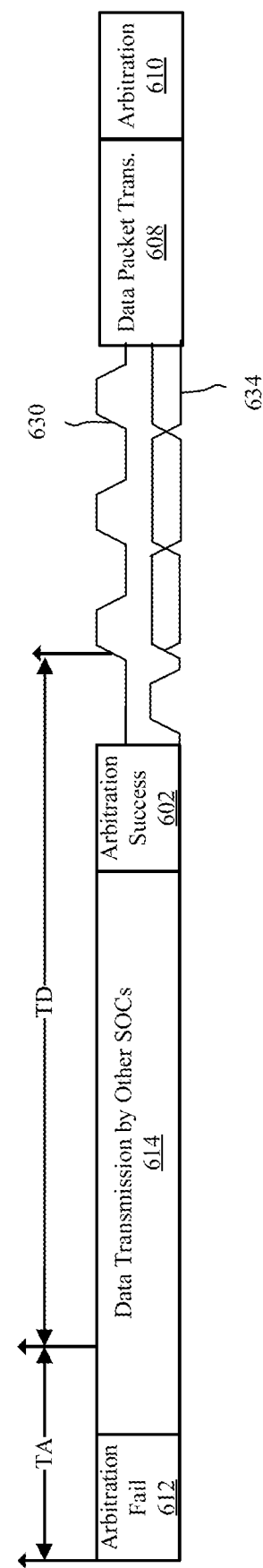

FIGS. 6A and 6B are timing diagrams illustrating delay time TD associated with transmitting data packet (e.g., timing packet or data packet) over multi-drop bus 220, according to one embodiment. The example of FIGS. 6A and 6B uses SPMI as multi-drop bus 220 where identification of a message transmitter (e.g., SOC 234B) device are sent out at the first low to high transition time of SPMI clock 630 followed by the transmission of data (or command) frames 608 when the attempt 602 for arbitration to use SPMI data bus 634 is successful.

In the timing diagram of FIG. 6A, the SPMI bus is not busy and the transmitter SOC (e.g., SOC 234A) successfully arbitrates the use of the SPMI bus for transmitting its data packet or timing packet to a destination SOC (e.g., coexistence hub device 212). After an amount of time TA representing the time at which the arbitration attempt is started and the first transition of the SPMI clock, the identification of the message transmitter (e.g., USID) is sent over the SMPI data bus 634. If another multidrop protocol bus is used then a similar consistent marker point can be used. Then data (or command) frames 608 are transmitted followed by another arbitration attempt 610 for transmitting subsequent data packets. Because the first arbitration attempt was successful, the delay time due to arbitration is zero. Therefore, the header in the data (or command) frames will indicate a delay time value of zero.

To the contrary, the SPMI bus is busy and unavailable in FIG. 6B, and therefore, the same transmitter SOC's first attempt to arbitrate for the use of the SMPI bus is unsuccessful. In this case, the transmitter SOC's use of the SPMI bus for transmitting its data packets or timing packets is delayed by the amount of time 614 consumed by transmission of data by other SOCs and a subsequent attempt arbitration attempt 602. The amount of time delayed due to the arbitration is TD. Hence, the header of the data (or command) frames include the delay time that corresponds to TD.

Although FIGS. 6A and 6B use SPMI bus as an example of multi-drop bus 220, the same principle and mechanism can be applied to other types of multi-drop buses.

Example Operation of Synchronization Generator

Figure 7A:
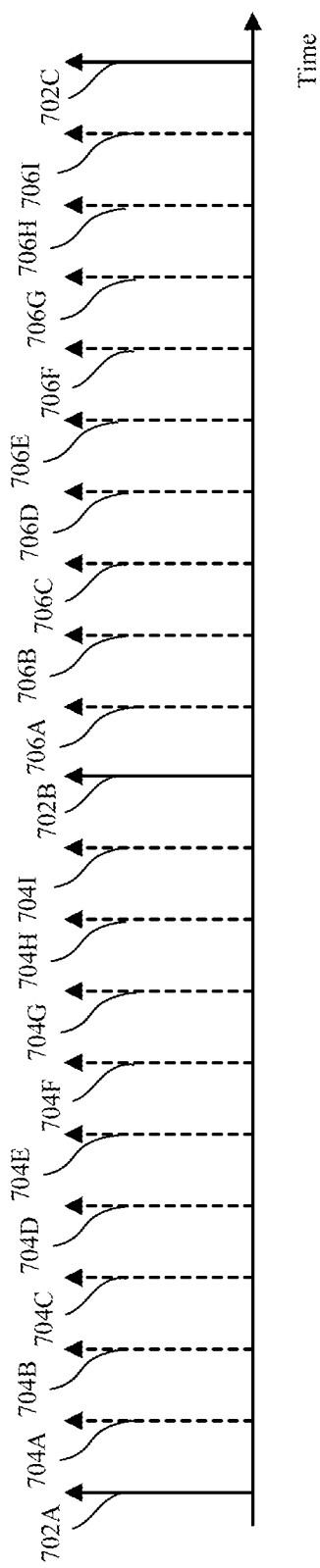
FIG. 7A is a timing diagram of timing signals generated by a synchronization generator, according to one embodiment.

FIG. 7A is a timing diagram illustrating timing signals 702, 704 and 706 generated by synchronization generator 350, according to one embodiment. Each of solid arrows 702A, 702B, 704C in FIG. 7A may indicate a starting time of a frame in a wireless Long-Term Evolution Time-Division Duplex (LTE-TDD) or Long-Term Evolution Frequency-Division Duplex (LTE-FDD), which has a period of 10 ms. Dashed arrows 704A through 704I and 706A through 706I may indicate the starting time of subframes in each LTE-TDD or LTE-FDD frame (collectively referred to as "LTE frame" herein), which has a period of 1 ms.

Referring to FIG. 4C, synchronization generator 350 receives event timing information 476 indicating the starting time of two or more frames (indicated by sold arrows 702). Counter programmer 480 sets one or more of programmable counters 470 to generate timing signals 478 at starting times 702A through 702C of LTE frames. Further, counter programmer 480 programs one or more of programmable counters 470 to generate timing signals 478 at times 704, 706 when subframes of each frame starts. For example, one or more of the programmable counters 470 may generate 9 timing signals at times 704A through 704I at equal intervals between starting times 702A, 702B of adjacent LTE frames. Similarly, one or more of the programmable counters 470 may generate 9 timing signals at times 706A through 706I at equal intervals between starting times 702B, 702C of LTE frames.

Timing signals 478 generated by the synchronization generator 350 may be sent to one or more communication subsystems 336 (e.g., communication subsystem 336A) so that the communication subsystems 336 may take certain actions or operations in anticipation of frame transmittal by a SOC (e.g., SOC 234A) that is responsible for LTE communication. Such actions or operations may be clearing out buffers in the communication subsystem 336 to free up the channel for use by other communication subsystems, or stopping communication operation in anticipation of interference from LTE SOC.

Figure 7B:
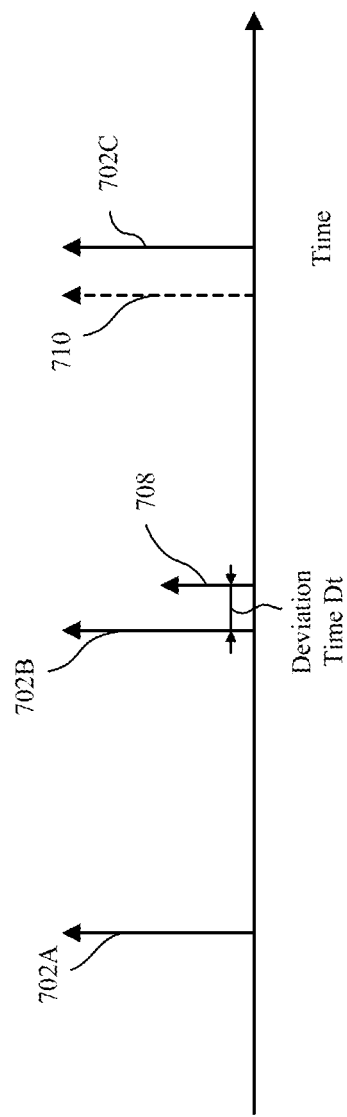
FIG. 7B is a timing diagram illustrating adjusting the operation of the synchronization generator, according to one embodiment.

FIG. 7B is a timing diagram illustrating an adjusting operation of synchronization generator 350, according to one embodiment. The times at which synchronization generator 350 generates timing signals 478 may deviate from accurate event times of external SOC as time progresses. Counter programmer 480 may adjust deviation of times at which the timing signals are generated using subsequent event timing information 476 received from the external SOC.

Alternatively or in addition, counter programmer 480 may use adjustment request 490 received from other components of coexistence hub device 212 that has accurate event timing information. For example, a communication subsystem (e.g., communication subsystem 336A) may communicate directly with the external SOC via a GPIO or fabric 222. Such components of coexistence hub device 212 may determine deviation time Dt corresponding to a difference in time 702B at which a timing signal 478 is generated and the actual time 708 at which an event occurs at the external SOC. If the deviation time Dt is above a threshold, the component may send adjustment request 490 to synchronization generator 350 to adjust subsequent timing signals.

After receiving the adjustment request 490, counter programmer 480 sends programming signal 482 to update one or more of the programmable counters 470. As a result, the time 702C at which the subsequent timing signal is adjusted relative to the time 710 at which the timing signal would have been generated without the adjustment.

Although the above example describes using timing signals 478 in the context of LTE frames and subframes, the same principle and mechanism can be applied to tracking and taking actions based on other periodic events. Such periodic events include Bluetooth tick or start of an agreed interval of cooperation between subsystems, other examples include Continuous DRX sleep timer interval count.

Example Process of Operating Synchronization Generator

Figure 8:
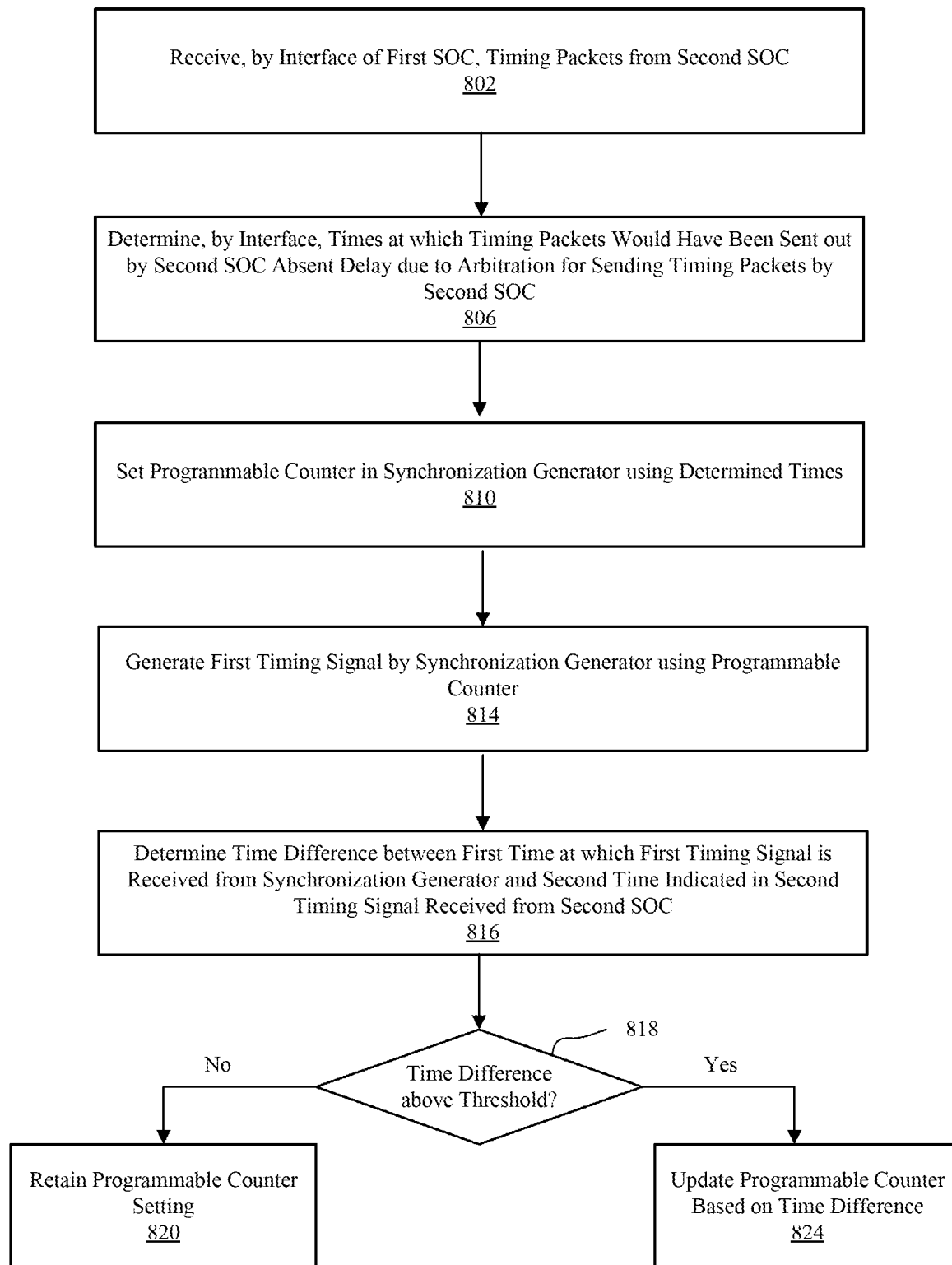
FIG. 8 is a flowchart illustrating the process of operating the synchronization generator, according to one embodiment.

FIG. 8 is a flowchart illustrating the process of operating synchronization generator 350, according to one embodiment. An interface of a first SOC (e.g., coexistence hub device 212) receives 802 timing packets including the event timing information from a second SOC (e.g., SOC 234A). The interface of the first SOC determines 806 times at which the timing packets would have been sent out by the second SOC absent delay due to unsuccessful arbitration attempts to use a multi-drop bus for sending the timing packets.

Based on the times at which the timing packets would have been sent out, one or more programmable counters in a synchronization generator is set 810. Using the programmed counters, the synchronization generator generates 814 first timing signals (e.g., timing signals 478).

In one or more embodiments, a component of the first SOC receives a second timing signal from the second SOC. Using the second timing signal, the first SOC determines 816 a time difference between a first time at which the first timing signal is received from the synchronization generator and a second time at which the second timing signal is received from the second SOC by the component of the first SOC.

It is then determined 818 if the time difference is above a threshold. If the time difference is not above a threshold, the setting of the programmable counters is retained 820. Conversely, if the time difference is above the threshold, the setting of the programmable counters is updated 824 to account for the time difference.

The steps and the sequence described above with reference to FIG. 8 are merely illustrative. One or more steps in FIG. 8 may be omitted or the sequence of steps may be changed.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An integrated circuit, comprising:
 an interface circuit, comprising:
  a physical layer circuit configured to receive inbound bitstreams over a multidrop bus, and convert the inbound bitstreams into an inbound data packet, and
  an inbound packet processor circuit configured to receive the inbound data packet, and extract an inbound time delay from the inbound data packet, the inbound time delay indicating an amount of time delayed in transmission of the inbound bitstream due to arbitration of the multidrop bus; and a component circuit coupled to the interface circuit and configured to receive the inbound time delay and perform operations according to the inbound time delay.

2. The integrated circuit of claim 1, wherein inbound packet processor circuit is further configured to determine a time at which the inbound data packet would have been received without a delay due to the arbitration using the inbound time delay.

3. The integrated circuit of claim 1, wherein the interface circuit further comprises:

a delay calculator circuit configured to receive a local clock signal and determine a time delay in transmitting an outbound data packet over the multi-drop bus due to arbitration using the local clock, and a packet assembly circuit configured to assemble the outbound data packet to include the data and outbound time delay information, the outbound time delay information representing an amount of time delayed in transmitting the outbound data due to the arbitration.

4. The integrated circuit of claim 3, wherein the physical layer circuit is further configured to perform arbitration for transmission of the outbound data packet over the multi-drop bus.

5. The integrated circuit of claim 3, wherein the packet assembly circuit is configured to include the outbound time delay information in a predetermined field of the outbound data packet.

6. The integrated circuit of claim 1, further comprising a synchronization generator circuit configured to generate one or more timing signals, and send the one or more timing signals to the component circuit.

7. The integrated circuit of claim 6, wherein the timing signals indicate when one or more periodic events are expected to occur.

8. The integrated circuit of claim 6, wherein the synchronization generator circuit is configured to receive timing packets over the multi-drop bus, and update times at which the one or more timing signals are generated according to the received timing packets.

9. The integrated circuit of claim 1, wherein the inbound time delay is indicated in terms of a global clock time.

10. The integrated circuit of claim 1, wherein the inbound data packet represents a coexistence message based on which operations of multiple integrated circuits coupled to the multidrop bus are coordinated.

11. A method for communicating over a multidrop bus, comprising:

receiving, by an interface circuit of an integrated circuit, inbound bitstreams over the multidrop bus;

converting, by the interface circuit, the inbound bitstreams into an inbound data packet;

extracting, by an inbound processor circuit of the integrated circuit, an inbound time delay from the inbound data packet, the inbound time delay indicating an amount of time delayed in transmission of the inbound bitstream due to arbitration of the multidrop bus; and performing, by a component circuit, operations according to the inbound time delay.

12. The method of claim 11, further comprising determining, by the inbound processor circuit, a time at which the inbound data packet would have been sent without a delay due to the arbitration using the inbound time delay.

13. The method of claim 11, further comprising:

determining a time delay in transmitting an outbound data packet over the multi-drop bus due to arbitration using a local clock, and assembling the outbound data packet to include the data and outbound time delay information, the outbound time delay information representing an amount of time delayed in transmitting the outbound data due to the arbitration.

14. The method of claim 13, further comprising performing arbitration for transmission of the outbound data packet over the multi-drop bus.

15. The method of claim 13, wherein the outbound time delay information is included in a predetermined field of the outbound data packet.

16. The method of claim 11, further comprising:

generating one or more timing signals; and sending the one or more timing signals to the component circuit.

17. The method of claim 16, wherein the timing signals indicate when one or more periodic events are expected to occur.

18. The method of claim 6, further comprising:

receiving timing packets over the multi-drop bus; and updating times at which the one or more timing signals are generated according to the received timing packets.

19. The method of claim 11, wherein the inbound time delay is indicated in terms of a global clock time.

20. The method of claim 11, wherein the inbound data packet represents a coexistence message based on which operations of multiple integrated circuits coupled to the multidrop bus are coordinated.

* * * * *